(12) United States Patent
Kropinski et al.

(10) Patent No.: US 7,181,334 B2
(45) Date of Patent: Feb. 20, 2007

(54) METHOD AND APPARATUS TO DIAGNOSE INTAKE AIRFLOW

(75) Inventors: Michael A. Kropinski, Troy, MI (US); Mark D. Miotke, White Lake, MI (US)

(73) Assignee: General Motors Corporation, Detroit, MI (US)

(*) Notice: Subject to any disclaimer, the term of this patent is extended or adjusted under 35 U.S.C. 154(b) by 193 days.

(21) Appl. No.: 10/437,809

(22) Filed: May 14, 2003

(65) Prior Publication Data
US 2004/0230368 A1  Nov. 18, 2004

(51) Int. Cl.
*B60T 7/12* (2006.01)
*G06F 19/00* (2006.01)
(52) U.S. Cl. ................................. 701/106; 701/114
(58) Field of Classification Search ................ 701/106, 701/114
See application file for complete search history.

(56) References Cited

U.S. PATENT DOCUMENTS

| | | | | |
|---|---|---|---|---|
| 5,483,936 A | * | 1/1996 | Kerstein et al. | 123/406.16 |
| 5,539,638 A | * | 7/1996 | Keeler et al. | 701/29 |
| 5,618,243 A | * | 4/1997 | Kondo et al. | 477/188 |
| 5,638,492 A | * | 6/1997 | Maeda et al. | 706/45 |
| 5,657,737 A | * | 8/1997 | Ishida et al. | 123/674 |
| 5,682,317 A | * | 10/1997 | Keeler et al. | 701/101 |
| 5,941,918 A | * | 8/1999 | Blosser | 701/29 |
| 6,882,929 B2 | * | 4/2005 | Liang et al. | 701/115 |

\* cited by examiner

*Primary Examiner*—John T. Kwon
(74) *Attorney, Agent, or Firm*—Christopher DeVries

(57) ABSTRACT

An engine control system including an engine controller, a plurality of sensors coupled to the engine controller, and a neural network operating in the engine controller, and where upon failure of at least one of the plurality sensors, the neural network generates a representative value of the failed sensor.

14 Claims, 2 Drawing Sheets

METHOD AND APPARATUS TO DIAGNOSE INTAKE AIRFLOW

TECHNICAL FIELD

The present invention relates to internal combustion engine controls. More specifically, the present invention relates to a method and apparatus for diagnosing sensors operating with an internal combustion engine.

BACKGROUND OF THE INVENTION

Today's automotive engine control system consists of engine sensors and actuators wired directly to an electronic control unit (ECU) or controller that contains embedded software. The complexity of the software continues to increase as the number of sensors and actuators used on the vehicle increases. Under current governmental regulations, each emission related sensor must be diagnosed such that faulty sensors are replaced as soon as possible to minimize pollution and poor vehicle performance. For this reason, each sensor is monitored by a diagnostic algorithm that is responsible for detecting sensor values that are irrational or out of range. There are countless ways that a diagnostic may differentiate a good sensor from a bad one, leading to an unwieldy diagnostic development process with many analysis options.

The current process of creating a diagnostic for sensors involves designing the algorithm, comparing data collected from a good sensor with that of a bad sensor and trying to determine the values for differentiating a good system from a bad one. The process of producing the parameters that differentiate a good sensor from a bad one for the various operating environments will be referred to as the diagnostic development process. This process is typically done manually by a person using trial and error to determine the differences in the system when sensors are good vs. when they are faulty. Decisions are based on data taken from different environments, which include different climates, altitudes, and vehicle operating conditions. Present diagnostic development processes are time consuming and rely heavily on heuristic data.

SUMMARY OF THE INVENTION

The present invention is a method and apparatus for diagnosing sensors in an internal combustion engine (ICE) using neural networks. A Neural Network (NN) is a mathematical tool that is used to perform complex calculations. It is a tool used to produce an equation or transfer function that relates known inputs to known outputs. A NN is trained on data exemplars that associate input values with desired output values. The training process involves adjusting internal NN weights in a manner that will minimize the error between the input values and the corresponding desired output values. A NN that is trained outside of the control system that it will be embedded in is said to be trained "off line". Alternatively, it is possible to train the NN "on line" while it is executing in the control system real time. Using either method, once the NN is fully trained and embedded in a control system, it will have the ability to execute complex calculations that otherwise would be very difficult to model with simple mathematical equations.

From a black box point of view, a NN is basically a complex transfer function that takes input values and translates them into output values. Inside the black box is a potentially complex structure of nodes and interconnections between the inputs and the outputs in a way that produces some desired result.

Neural networks are inspired by the operation of the human brain which is made up of billions of neurons interconnected by synapses, and like a human brain, a NN must be trained. The training process involves taking a series of known input/output data pairs, called exemplars, which are fed into a training algorithm, such as back-propagation process, to produce a least squares error for each input. Essentially, the training algorithm iterates through each exemplar and adjusts the weights of the interconnections between each node to produce an overall transfer function that will generate the correct output for each exemplar. The overall transfer function is made up of the combination of the nodes, which themselves constitute a single transfer function, that is multiplied by the sum of the weighted connections coming into it.

Once the NN is sufficiently trained, it is able to calculate output values for any input even if the input value was not explicitly used in the original training set. Once the trained NN is implemented in a system with live input values, the outputs will equal those used during training when the input matched one of the training pairs used. Otherwise, the output is a calculated value based on the overall transfer function of the NN that resulted from the training.

The present invention further incorporates an Auto Associative Neural Network (AANN) into a diagnostic that shifts a portion of the analysis burden from an engineer to a computer. Once a diagnostic is successfully developed, the end result is an algorithm that communicates to the vehicle when default or fail-soft action is necessary. The algorithm development required to generate proper fail-soft values is critical to customer satisfaction. A vehicle that can continue to run in the presence of a fault will minimize customer inconvenience while a stranded vehicle will not. The Auto Associative Neural Network Diagnostic (AANND) of the present invention has characteristics that lead to an improved diagnostic development process, accurate fault detection of related groups of sensors, and superior fail-soft value determination. The benefits of an AANND are dependent on how well a group of sensors are related to one another and on how well the AANN can be trained.

The process of training an AANN shifts some of the burden of analysis from an engineer to a computer, which learns a transfer function that allows the present diagnostic to differentiate a good system from a bad one. The normal analysis done by an engineer is handled automatically when the AANN is trained with data from a good system. Furthermore, the data used to represent a bad system is also generated automatically by scripts used during the training procedure. Consequently, analysis work done previously in a development vehicle can now be done off line, freeing up an expensive development resource.

In one embodiment of the present invention, a diagnostic has been developed that monitors three sensors related to the air flowing into an engine. The diagnostic includes a trained AANN to detect a single sensor fault on any one of three sensors, and provide accurate fail-soft values that are dependent on the values read from the remaining good sensors. The outputs of the AANN are estimated values that track the actual values of a good sensor.

In another embodiment of the present invention, virtual sensor values may be used to replace traditional physical sensors in a control system.

The diagnostic AANN of the present invention creates a complex transfer function that compresses redundant information present in sensor values on its inputs, which are later uncompressed to produce the same exact values on its outputs. This trained AANN is then put in a vehicle where it will continue to generate output values equal to the input values while the sensors are good. However, when a bad sensor value appears on the input then a non-identical output value will be calculated. A difference between a calculated output value and its corresponding input value would be used to flag a fault. And if the fault persisted, the estimated output would be fed back to the system to be used as a dynamic fail-soft value until the diagnostic was reset.

DESCRIPTION OF THE PREFERRED EMBODIMENT

Figure 1:
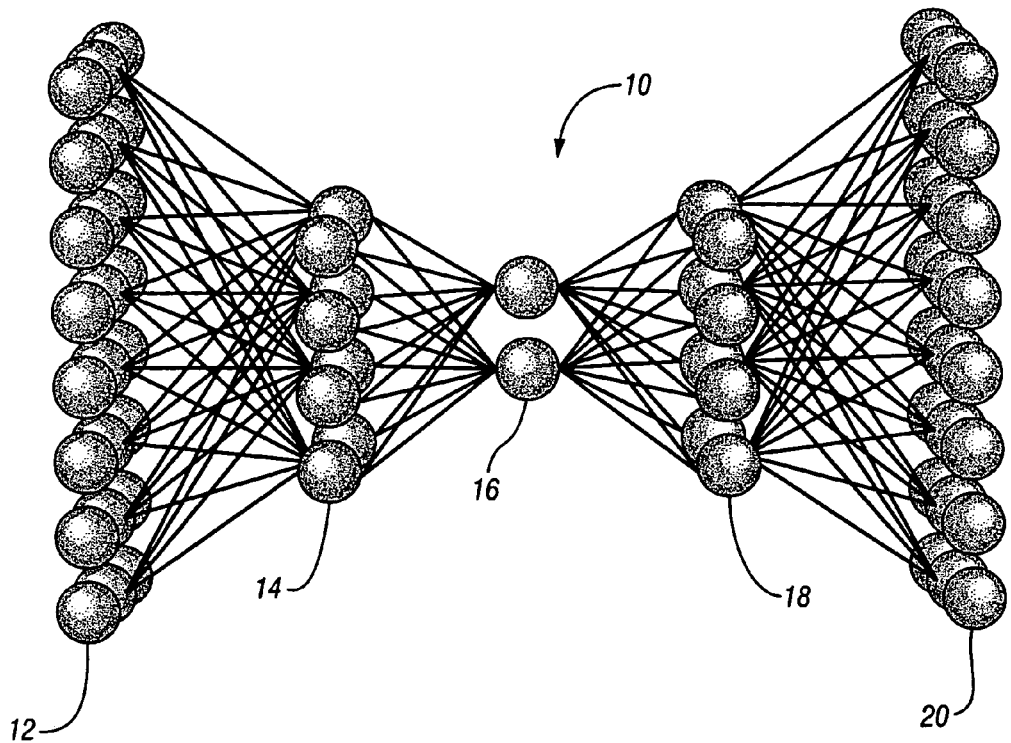
FIG. 1 is a diagrammatic drawing of an auto associative neural network.

FIG. 1 is a diagrammatic drawing of an Auto Associative Neural Network (AANN) 10 including an input layer 12; three hidden layers comprising a mapping layer 14, a bottle-neck layer 16, a de-mapping layer; and an output layer 20. The overall transfer function of the AANN 10 of the present invention is equal to 1, as the outputs are trained to be equal to the values on the corresponding inputs. The design of the AANN 10 uses compression of data in the bottleneck layer 16 to achieve an overall transfer function that is not trivially equal to 1. For this type of AANN to work properly, the input data has the property of analytical redundancy where the inputs to the AANN 10 are physically related somehow. The analytically redundant information will be used to generate correct output values when the inputs are only partially correct or in a fault condition. For example, when a sensor is faulty on one input, there is enough information coming from the other inputs to generate a correct output value for the faulty sensor. The AANN 10 of the present invention with analytical redundancy can be used to calculate expected values for each output that can then be used to detect bad input values and provide fail-soft values for the system in place of the faulty sensor value. To achieve robustness and to produce a non-corrupted output value for inputs containing gross errors, the AANN 10 is trained on exemplars that represent this input-output behavior.

Once an AANN 10 is initially trained using a sufficient number of good data values to represent the system over its complete operating range, it has the capability to make its outputs equal to its inputs as long as a sensor fault is not present. If the training is stopped at this point, the AANN 10 is trained to model a good system such that it could be used to detect faults in a traditional manner. The current sensor values are compared to the calculated outputs of the AANN 10, and a fault is flagged when the differences between the two exceeded a threshold. However, if the training is taken a step further, and the system is trained on data that is representative of bad sensors, then the output of the AANN 10 may be used to provide fail-soft values for the bad input all at once. Training the AANN 10 involves the compilation of heuristic data, as there are several "knobs" that can be turned during the training process. The end result of training is an AANN 10 that will produce outputs equal to its inputs when good sensor values are present and fail-soft values when faulty sensors are present. AANNs that have gone through this second step of training, with exemplars of faulty sensors, will be referred to as robust AANNs. The AANN 10 developed in the preferred embodiment of the present invention will be of the robust type.

Figure 2:
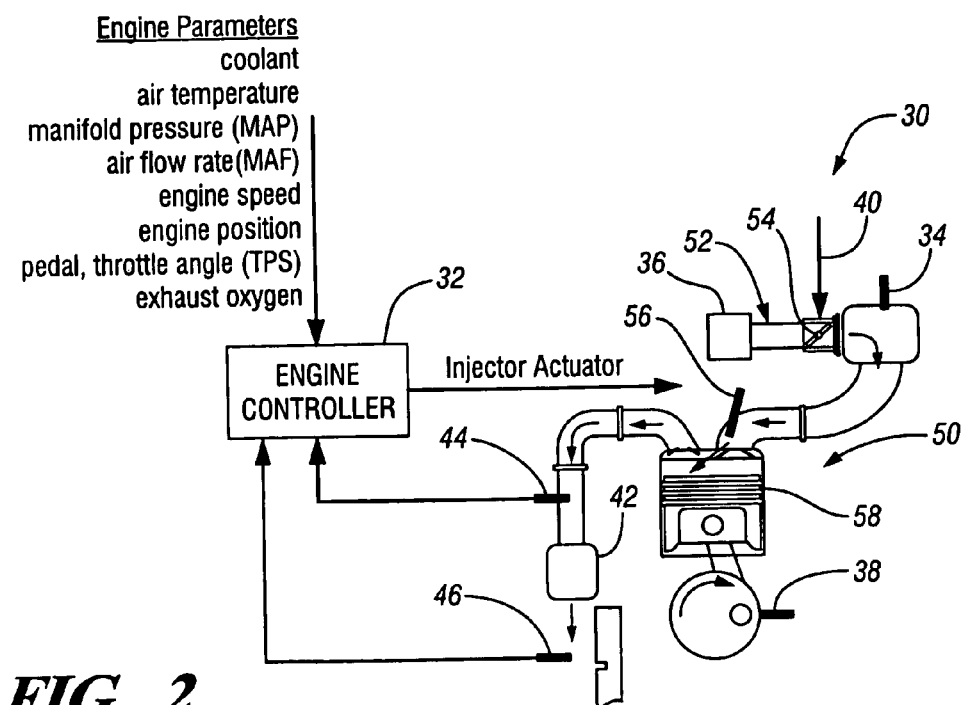
FIG. 2 is a diagrammatic drawing of an engine control system of the present invention.

The present invention in a preferred embodiment utilizes the AANN 10 in an automotive application as show by the engine control system 30 of FIG. 2, but any sensor application is considered within the scope of the present invention. The engine control system 30 includes an engine controller 32 receiving sensor measurements of coolant temperature; air temperature; manifold pressure (MAP) from MAP sensor 34; manifold air flow rate (MAF) from MAF sensor 36; engine speed and engine position from engine position sensor 38; pedal position; throttle position or angle (TPS) from throttle position sensor 40; and exhaust oxygen measurements before and after a catalytic converter 42 by oxygen sensors 44 and 46

Air enters an internal combustion engine (ICE) 50 through an intake manifold 52. A throttle plate 54 controls air flow through the ICE 50 and may be controlled electronically or manually by a wire connected to an accelerator pedal. The air is mixed with fuel from a fuel injector 56 controlled by the engine controller 32. The air/fuel mixture enters a piston 58 where it is ignited to rotate a crankshaft, as is commonly known in the art. The exhaust gases are oxidized and reduced by the catalytic converter 42, as is commonly known in the art.

The sensors relating to air entering the engine manifold have the property of analytical redundancy and will be used in the preferred embodiment of the present invention. Specifically, the MAP sensor 34, MAF sensor 36, and TPS sensor 40 are related to air flow through the ICE 50. The MAF sensor 36 measures the amount of air being drawn into the ICE 50, the MAP sensor 34 measure the pressure in the ICE 50, and the TPS sensor 40 measure the throttle blade 54 angle or area.

Figure 3:
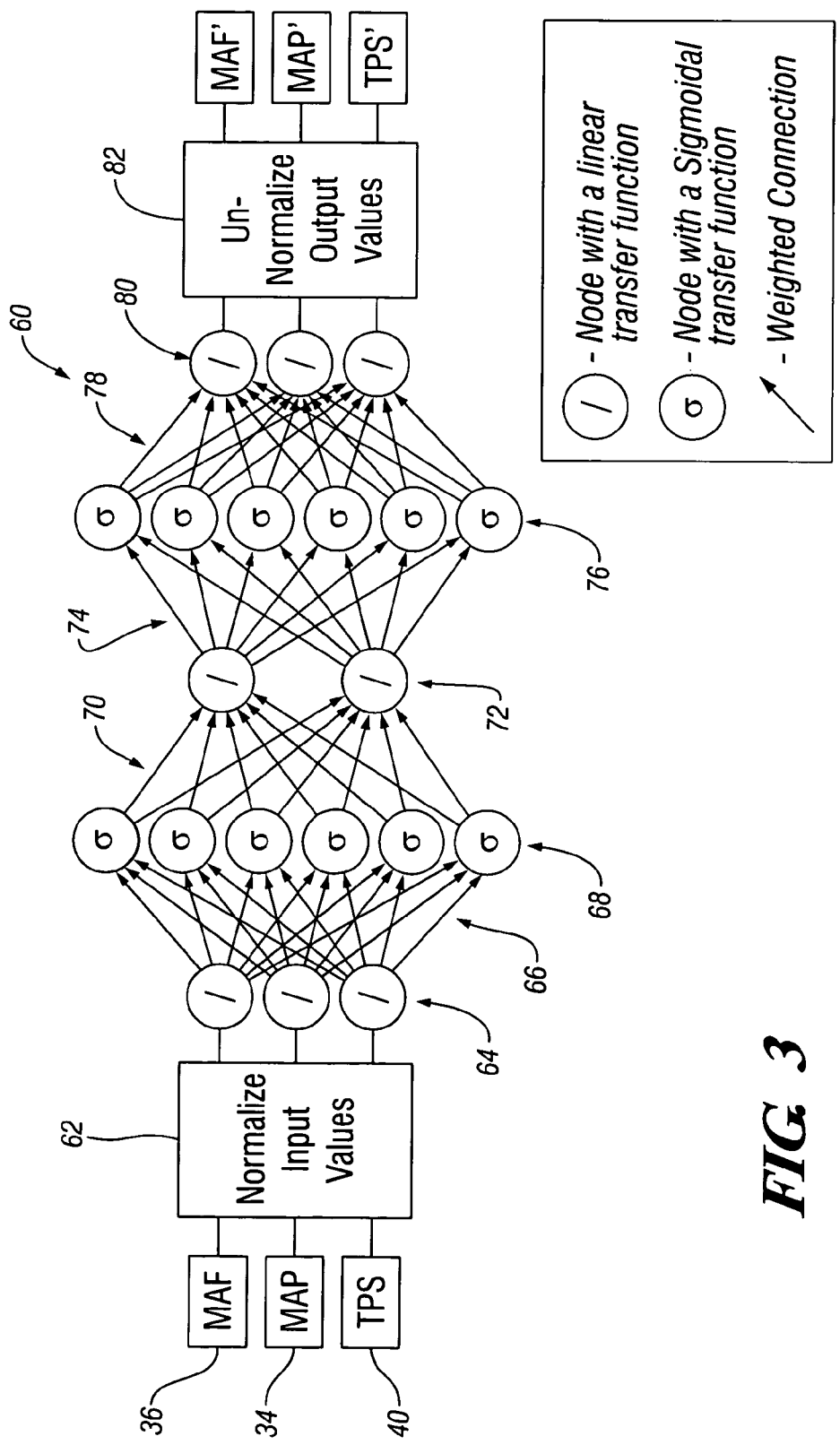
FIGS. 3 is a diagram of a preferred neural network used to control an engine in the present invention.

FIG. 3 is a diagrammatic drawing of a preferred embodiment of an AANN 60 in the present invention. MAP, MAF, and TPS sensors 34, 36, and 40 are input to a normalization function 62. The normalized sensor values are processed at an input layer 64 having a linear transfer function. The input layer generates outputs to weighted connections 66. A mapping layer 68 having sigmoidal transfer functions outputs values to weighted functions 70. A bottleneck layer 72 processes the inputs from the weighted connections 70 and generates outputs to weighted connections 74. The weighted connections 74 output signals to a de-mapping layer 76 and outputs values to weighted connections 78. An input layer 80 having a linear transfer function processes the outputs from weighted connections 78. Block 82 un-normalizes the outputs from block 80 to generate representative values MAF', MAP', and TPS'. The functions of Auto Associative Neural Network 60 (layers 62–82) described above is as follows:

$$a = F_1(W_5 F_2(W_4 F_1(W_3 F_2(W_2 F_1(W_1 p + b_1) + b_2) + b_3) + b_4) + b_5)$$

Where $F_1$ = Linear Transform Function $F_2$ = Tan-Sigmoid Transfer Function $W_1$ = Weight Vector for Input Layer 64 (3×3 Matrix)

$W_2$ = Weight Vector for Mapping Layer 68 (6×3 Matrix)

$W_3$ = Weight Vector for Bottleneck Layer 72 (2×6 Matrix)

$W_4$ = Weight Vector for De-Mapping Layer 76 (6×2 Matrix)

$W_5$=Weight Vector for Output Layer 80 (3×6 Matrix)
$b_1$=Bias Vector for Input Layer 64 (3×1 Matrix)
$b_2$=Bias Vector for Mapping Layer 68 (6×1 Matrix)
$b_3$=Bias Vector for Bottleneck Layer 72 (2×1 Matrix)
$b_4$=Bias Vector for De-Mapping Layer 76 (6×1 Matrix)
$b_5$=Bias Vector for Output Layer 80 (3×1 Matrix)
p=input pattern (3×1 Matrix)
a=output pattern (3×1 Matrix)

The representative values MAF', MAP', and TPS' should generally equal the values generated by the MAP, MAF and TPS sensors 34, 36, and 40 under normal operating conditions or under a fault condition for any of the sensors 34, 36, and 40. Accordingly, the engine control system 30 may still operate within normal parameters if there is a fault, or in alternate embodiments, the representative values may be used to replace a physical sensor.

In alternate embodiments of the present invention, other related sensor groupings such as engine speed, transmission speed, wheel speed sensors, related sensors such as throttle position sensors, and other similar sensor groupings may be used in the present invention.

It is to be understood that the invention is not limited to the exact construction illustrated and described above, but that various changes and modifications may be made without departing from the spirit and scope of the invention as defined in the following claims.

The invention claimed is:

1. An engine control system comprising:
   an engine controller;
   a plurality of sensor coupled to said engine controller;
   a neural network operating in said engine controller; and
   wherein upon failure of at least one of said plurality of sensors said neural network generates a representative value of said failed sensor.

2. The engine control system of claim 1 wherein said plurality of sensors includes a manifold pressure sensor, an air flow sensor, and a throttle position sensor.

3. The engine control system of claim 1 wherein said neural network continually generates representative values for said plurality of sensors.

4. The engine control system of claim 1 wherein said neural network has a transfer function of unity.

5. The engine control system of claim 1 wherein said neural network is an auto associative neural network.

6. The engine control system of claim 1 wherein said plurality of sensors includes, a transmission speed sensor, an engine speed sensor, and wheel speed sensors.

7. The engine control system of claim 1 further including a compression ignition engine.

8. A method of engine control comprising:
   determining a set of sensor measurements;
   processing said sensor measurement to determine representative values of said sensor measurements; and
   determining a sensor fault based on a comparison of said set of sensor measurements and said representative values of said sensor measurements.

9. The method of claim 1 wherein said step of processing said sensor measurement to determine representative values of said sensor measurements comprises processing said sensor measurements with a neural network.

10. A control system for a vehicle comprising:
    an engine;
    a controller controlling said engine;
    a plurality of sensors coupled to said controller;
    a neural network operating in said controller generating sensor signals for said controller; and
    wherein said plurality of sensors generates a virtual sensor value.

11. The control system of claim 10 wherein said plurality of sensors comprise a pressure sensor, an air flow sensor, and a throttle position sensor.

12. The control system of claim 10 wherein said neural network has a transfer function of unity.

13. The control system of claim 10 wherein said neural network examines the plurality of sensors for faults and generates a representative signal for a faulted sensor.

14. A method of engine control comprising:
    providing an internal combustion engine;
    providing a controller to control the internal combustion engine;
    providing a neural network operating in said controller;
    determining a set of sensor measurements;
    processing said sensor measurements with the neural network to determine representative values of said sensor measurements; and
    wherein at least one of said representative values of said sensor measurements is a virtual sensor element where said virtual sensor measurement replaces a traditional physical sensor measurement.

* * * * *